US012778130B2

(12) United States Patent
Weber et al.

(10) Patent No.: US 12,778,130 B2
(45) Date of Patent: Nov. 3, 2026

(54) WATER CONDITIONERS FOR AGRICULTURAL FORMULATIONS

(71) Applicant: Stepan Company, Northbrook, IL (US)

(72) Inventors: Eric M. Weber, Arlington Heights, IL (US); Andrea B. E. Brayton, Vernon Hills, IL (US); Ryan K. Totten, Park Ridge, IL (US)

(73) Assignee: STEPAN COMPANY, Northbrook, IL (US)

( * ) Notice: Subject to any disclaimer, the term of this patent is extended or adjusted under 35 U.S.C. 154(b) by 286 days.

(21) Appl. No.: 18/561,490

(22) PCT Filed: Jul. 20, 2022

(86) PCT No.: PCT/US2022/037768

§ 371 (c)(1),
(2) Date: Nov. 16, 2023

(87) PCT Pub. No.: WO2023/009369

PCT Pub. Date: Feb. 2, 2023

(65) Prior Publication Data

US 2024/0237653 A1 Jul. 18, 2024

Related U.S. Application Data

(60) Provisional application No. 63/226,085, filed on Jul. 27, 2021.

(51) Int. Cl.

| | |
|---|---|
| ***A01N 59/02*** | (2006.01) |
| ***A01N 25/02*** | (2006.01) |
| ***A01N 33/08*** | (2006.01) |
| ***A01P 15/00*** | (2006.01) |

(52) U.S. Cl.

CPC ............. *A01N 59/02* (2013.01); *A01N 25/02* (2013.01); *A01N 33/08* (2013.01); *A01P 15/00* (2021.08)

(58) Field of Classification Search

CPC ........ A01N 59/02; A01N 25/02; A01N 33/08; A01P 15/00

See application file for complete search history.

(56) References Cited

U.S. PATENT DOCUMENTS

| | | | | |
|---|---|---|---|---|
| 5,356,861 A | | 10/1994 | Gednalski | |
| 5,888,934 A | * | 3/1999 | Townson | A01N 57/20 504/206 |
| 5,945,377 A | | 8/1999 | Penner | |
| 6,228,807 B1 | | 5/2001 | Kuchikata | |
| 6,645,914 B1 | | 11/2003 | Woznica | |
| 7,666,242 B2 | | 2/2010 | Gednalske | |
| 2008/0317795 A1 | * | 12/2008 | Traynor | A61Q 19/10 424/59 |

FOREIGN PATENT DOCUMENTS

| | | |
|---|---|---|
| EP | 0274369 | 7/1988 |
| WO | 2012104237 | 8/2012 |
| WO | 2016057170 | 4/2016 |

OTHER PUBLICATIONS

International Search Report issued in PCT/US2022/037768, mailed on Nov. 14, 2022.

* cited by examiner

*Primary Examiner* — Trevor Love
(74) *Attorney, Agent, or Firm* — DILWORTH IP, LLC

(57) ABSTRACT

Water conditioner compositions useful for agricultural formulations are disclosed. The compositions comprise ammonium sulfate, water, an optional antifreeze agent, and a blend comprising a $C_{12}$-$C_{14}$ fatty amine oxide and a $C_8$-$C_{10}$ fatty amine oxide. Agricultural formulations that comprise a weak acid-based herbicide and the water conditioner compositions are also described. The fatty amine oxides are compatible with the levels of ammonium sulfate needed for effective water conditioning. The formulated water conditioners resist separation for weeks at elevated and cold temperatures. Compared with water conditioners that contain alkylpolyglucosides, those formulated with the fatty amine oxide blends have reduced foaming problems and excellent wetting properties at relatively low surfactant concentration, thus demonstrating performance and cost advantages.

10 Claims, No Drawings

WATER CONDITIONERS FOR AGRICULTURAL FORMULATIONS

FIELD OF THE INVENTION

The invention relates to ammonium sulfate-based water conditioners useful for agricultural formulations.

BACKGROUND OF THE INVENTION

Ammonium sulfate is a well-known fertilizer for alkaline soils. It is also used to bind calcium, iron, and other metals to improve the efficacy of water-soluble herbicides, insecticides, and fungicides, particularly weak-acid herbicides such as glyphosate, glufosinate, and 2,4-D. When combined with certain classes of surfactants, especially alkylpolysaccharides, ammonium sulfate functions as an effective water conditioner for agricultural compositions.

Fatty amine oxides are well known and commercially available surfactants. Stepan Company, for example, sells AMMONYX® LO, a mixture of $C_{12}$ and $C_{14}$ fatty amine oxides (primarily N,N-dimethyl-N-dodecylamine-N-oxide), and AMMONYX® DO, a mixture of $C_8$ and $C_{10}$ fatty amine oxides (primarily N,N-dimethyl-N-decylamine-N-oxide).

U.S. Pat. No. 5,356,861 describes glyphosate formulations that include water, ammonium sulfate, an alkylpolysaccharide, and an anti-foaming agent. The reference indicates that the alkylpolysaccharide enables dissolution of an increased concentration of the ammonium sulfate in the herbicidal blend (col. 3, II. 34-37).

U.S. Pat. No. 5,945,377 suggests combining glyphosate or glufosinate with ammonium sulfate and a monosaccharide (e.g., corn syrup or fructose).

EP 0 274 369 describes glyphosate-ammonium sulfate herbicidal formulations that include a quaternary ammonium salt, which, according to the reference, can include amine oxides such as N-lauryl-N,N-dimethylamine-N-oxide. Example II shows an IPA glyphosate formulation with 27.1 wt. % ammonium sulfate and 13.4 wt. % of N-lauryl-N,N-dimethylamine-N-oxide. No amine oxide blends are described.

U.S. Pat. No. 6,228,807 discloses many glyphosate formulations that include ammonium sulfate as a component, but none with both ammonium sulfate and an amine oxide surfactant blend.

U.S. Pat. No. 6,645,914 describes surfactant-ammonium sulfate adjuvants in which the surfactant is a liquid amphoteric iminodipropionate. The reference explains that ammonium sulfate "overcomes the antagonistic effect of sodium, calcium, and magnesium ions from hard water" and may "increase herbicide absorption." Blends of amine oxide surfactants are not suggested.

U.S. Pat. No. 7,666,242 describes combinations of ammonium sulfate, an alkylpolysaccharide, and a sugar as adjuvant blends for spray application. Amine oxides are not suggested.

Although most commercial ammonium sulfate-based water conditioners contain alkylpolyglucoside surfactants, formulators appreciate that these water conditioners often have limited compatibility with common agricultural actives, low storage stability, and excessive foaming problems. The industry would therefore benefit from the availability of ammonium sulfate-based water conditioners based on surfactants or surfactant blends that avoid these limitations of alkylpolyglucosides. Ideally, the surfactants would already be articles of commerce approved for use in agriculture by applicable regulatory agencies.

SUMMARY OF THE INVENTION

In one aspect, the invention relates to a water conditioner composition useful for agricultural formulations. The composition comprises ammonium sulfate, water, and a fatty amine oxide blend. The compositions comprise 30 to 50 wt. % of ammonium sulfate and 2 to 10 wt. % of the fatty amine oxide blend. The blend comprises a $C_{12}$-$C_{14}$ fatty amine oxide and a $C_8$-$C_{10}$ fatty amine oxide. The weight % amounts are based on the amount of water conditioner composition. In some aspects, the compositions include an antifreeze agent, a secondary surfactant, or both.

In other aspects, the invention includes agricultural formulations that comprise a weak acid-based herbicide (e.g., glyphosate, glufosinate, 2,4-D, or dicamba) and the water conditioner compositions described above.

We surprisingly found that among many possible alternative surfactants, commercially available fatty amine oxides are highly compatible with the levels of ammonium sulfate needed for effective water conditioning. The amine oxide blends impart considerable flexibility in formulating water conditioners that resist separation for weeks at elevated (e.g., 54° C.) and cold (e.g., 4° C. or −15° C.) temperatures. Surprisingly, ammonium sulfate-based water conditioners having a blend of the fatty amine oxides provide valuable stability advantages when compared with formulations based on a single fatty amine oxide. Compared with water conditioners that contain alkylpolyglucosides, those formulated with the fatty amine oxide blends have reduced foaming problems and excellent wetting properties at relatively low surfactant concentration, thus demonstrating both performance and cost advantages.

DETAILED DESCRIPTION OF THE INVENTION

Water Conditioners

In some aspects, the invention relates to water conditioner compositions useful for agricultural formulations. The water conditioners comprise ammonium sulfate, water, an optional antifreeze agent, and a fatty amine oxide blend.

Ammonium Sulfate

Agricultural-grade ammonium sulfate is available from many suppliers. In general, the purity level is not crucial. Suitable water conditioner compositions will comprise 30 to 50 wt. %, or 30 to 40 wt. %, or 33 to 35 wt. % of ammonium sulfate, based on the amount of water conditioner composition.

Blend of Fatty Amine Oxides

The water conditioner compositions comprise 2 to 10 wt. %, or in some aspects 3 to 8 wt. %, based on the amount of water conditioner composition, of a fatty amine oxide blend. The blend comprises a $C_{12}$-$C_{14}$ fatty amine oxide and a $C_8$-$C_{10}$ fatty amine oxide. Suitable $C_{12}$-$C_{14}$ fatty amine oxides and $C_8$-$C_{10}$ fatty amine oxides are available commercially from Stepan Company as AMMONYX® LO and AMMONYX® DO, respectively. AMMONYX® LO is principally N,N-dimethyl-N-dodecylamine-N-oxide (a $C_{12}$ fatty amine oxide, also known as "lauramine oxide") with some N,N-dimethyl-N-tetradecylamine-N-oxide. AMMONYX® DO is principally N,N-dimethyl-N-decylamine-N-oxide (a $C_{10}$ fatty amine oxide) with some N,N-dimethyl-N-octylamine-N-oxide.

The weight ratio of $C_{12}$-$C_{14}$ fatty amine oxide and a $C_8$-$C_{10}$ fatty amine oxide components in the blend can vary over a wide range. In some aspects, the $C_{12}$-$C_{14}$ fatty amine oxide is the major component, although we found that water conditioner compositions having only the $C_{12}$-$C_{14}$ fatty amine oxide present are considerably less effective providing storage stable water conditioners than conditioner compositions that include both $C_8$-$C_{10}$ and $C_{12}$-$C_{14}$ fatty amine oxides (see results in Tables 4-6 versus results in Table 7). Thus, in some aspects, the weight ratio of $C_{12}$-$C_{14}$ fatty amine oxide to $C_8$-$C_{10}$ fatty amine oxide is within the range of 10:1 to 1:1. In other aspects, the weight ratio of $C_{12}$-$C_{14}$ fatty amine oxide to $C_8$-$C_{10}$ fatty amine oxide is within the range of 4:1 to 1:1.

Water

The water conditioner compositions also contain water in an amount effective to solubilize the ammonium sulfate, antifreeze agent, fatty amine oxide blend, and any other components. Typically, the amount of water ranges from 25 to 68 wt. %, to 65 wt. %, or 45 to 60 wt. %, based on the amount of water conditioner composition.

Antifreeze Agent

Optionally, the water conditioner compositions comprise 2 to 8 wt. %, or 3 to 7 wt. %, or 4 to 6 wt. %, based on the amount of water conditioner composition, of an antifreeze agent. The antifreeze agent, when used, helps to minimize or prevent the formation of precipitates or crystals of ammonium sulfate and/or agricultural active (following combination of the water conditioner composition with the agricultural active). Suitable antifreeze agents are well known. In some aspects, the antifreeze agent is a $C_2$-$C_6$ glycol. Suitable antifreeze agents include, for example, glycerin, ethylene glycol, propylene glycol, diethylene glycol, dipropylene glycol, hexylene glycol, and the like, and mixtures thereof. Glycerin and propylene glycol are preferred.

Other Components

The water conditioners can include other components such as secondary surfactants (nonionic surfactants, anionic surfactants, cationic surfactants, amphoteric surfactants, zwitterionic surfactants), solvents, pH-adjusting agents, anti-foaming agents, chelating agents, or the like. In some aspects, the water conditioners consist of or consist essentially of ammonium sulfate, the fatty amine oxide blend and water. In other aspects, the water conditioners consist of or consist essentially of ammonium sulfate, the fatty amine oxide blend, an antifreeze agent, and water.

Agricultural Formulations

In some aspects, the invention includes agricultural formulations that comprise a weak acid-based herbicide and the water conditioner compositions described above. Suitable weak acid-based herbicides include compositions having weakly acidic protons. Many weak-acid herbicides are organic compounds that have carboxylic acid groups, phosphoric acid groups, or other relatively acidic protons. Classes of weak-acid herbicides include, for example, glyphosates, glufosinates, phenoxycarboxylic acids (e.g., 2,4-D, MCPA, MCPP, 2,4-DB, 2,4-DP), halobenzoic acids (e.g., dicamba), pyrimidine or pyridine carboxylic acids or carboxamides (e.g., aminocyclopyrachlor, picloram, imazethapyr, cyclopyralid, diflufenican), sulfonylureas (e.g., metsulfuron methyl), and the like, and combinations thereof.

The following examples merely illustrate the inventive subject matter. Many similar variations within the scope of the claims will immediately be apparent to those skilled in the art.

Compatibility of Ammonium Sulfate with Surfactants

For use in water conditioning, ammonium sulfate is generally formulated as an aqueous solution at about 34 wt. % of $(NH_4)_2SO_4$. A series of commercially available surfactants is combined at 5 or 10 wt. % surfactant with 34 wt. % ammonium sulfate to identify surfactants having adequate compatibility. Alkylpolyglucosides, which are compatible and commonly used in ammonium sulfate-based water conditioners, are not tested. In each case, ammonium sulfate is gradually added with good mixing to an aqueous solution of the surfactant. As shown in Table 1, relatively few classes of the screened surfactants are considered suitable for use based only on compatibility.

TABLE 1

Representative Surfactant Compatibility with 34 wt. % Ammonium Sulfate

| product[1] | class | wt. % | compatible? |
|---|---|---|---|
| STEOL ® CS270 | sodium laureth 2 EO sulfate | 5 | no |
| | | 10 | no |
| STEOL ® C5460 | sodium laureth 3.5 EO sulfate | 5 | no |
| | | 10 | no |
| AMMONYX ® LO | N,N-dimethyl-N-dodecylamine oxide | 5 | yes |
| | | 10 | yes |
| AMMONYX ® DO | N,N-dimethyl-N-decylamine oxide | 5 | yes |
| | | 10 | yes |
| AMMONYX ® MO | N, N-dimethyl-N-tetradecylamine oxide | 5 | no |
| | | 10 | no |
| STEPFAC ® 8170 | nonylphenol ethoxylate phosphate ester | 5 | no |
| | | 10 | no |
| MAKON ® DA-6 | decyl alcohol 6 EO ethoxylate | 5 | no |
| | | 10 | no |
| TOXIMUL ® CA-7.5 | cocamine ethoxylate | 5 | no |
| | | 10 | no |
| TOXIMUL ® SEE-340 | sorbitan trioleate ethoxylate | 5 | no |
| | | 10 | no |
| TOXIMUL ® TA-8 | tallowamine 8 EO ethoxylate | 5 | no |
| TOXIMUL ® TA-15 | tallowamine 15 EO ethoxylate | 5 | no |
| HALLCOMID ® M8-10 | N,N-dimethylcapramide/N,N-dimethylcaprylamide mixture | 5 | no |
| BIO-TERGE ® AS-40 | $C_{14}$-$C_{16}$ α-olefin sulfonate | 5 | yes |
| | | 10 | yes |
| AMMONYX ® LO/ AMMONYX ® DO/ PG blend | amine oxide mixture with propylene glycol | 5 | yes |
| MAKON ® TD-50 | tridecyl alcohol ethoxylate | 10 | no |
| MAKON ® TSP-60F | tristyrylphenol ethoxylate | 10 | no |

[1]All surfactants are products of Stepan Company.

Shake Foam Test

A drawback of alkylpolyglucosides (APG) as surfactants for ammonium sulfate-based water conditioners is their tendency to produce stable foams. To compare the foaming properties of water conditioners made using amine oxide surfactants with those made using APG, the properties of both formulations are evaluated using the shake foam test.

Aqueous solutions containing 34 wt. % of ammonium sulfate and 56 wt. % of water are prepared. A comparative solution contains 10 wt. % of GLUCOPON® 420-UP alkylpolyglucoside surfactant (product of BASF). A test solution contains 3.5 wt. % of AMMONYX® LO surfactant, 1.5 wt. % of AMMONYX® DO surfactant, and 5.0 wt. % of semi-refined glycerin.

A 100-g portion of the solution is carefully transferred to a 500-mL graduated cylinder. The cylinder is stoppered and mechanically inverted ten times, then allowed to settle for 15 s. The initial foam height is recorded. After 5 min., foam height is recorded again. Two trials are performed for each mixture. Results appear in Table 2.

TABLE 2

| Shake Foam Test Results Aqueous Ammonium Sulfate + Surfactant | | | | |
|---|---|---|---|---|
| Surfactant | Trial | Initial Foam Height (mL) | Foam Height at 5 min. (mL) | Change in foam height (mL) |
| Amine oxide blend | 1 | 140 | 130 | 10 |
| | 2 | 140 | 130 | 10 |
| Alkylpolyglucoside | 1 | 170 | 170 | 0 |
| | 2 | 180 | 180 | 0 |

As shown in Table 2, the ammonium sulfate solution formulated with the amine oxide blend generates less foam volume than the solution formulated with the APG surfactant. Additionally, and the resulting foam begins to disintegrate more quickly with the amine oxide blend.

Draves Wetting Comparison

Draves wetting experiments are performed generally as described in ASTM D2281-68. "Rapid" wetting is considered to be less than about 40 seconds.

For the control experiment, the ammonium sulfate mixture with GLUCOPON® 420-UP prepared as previously described is diluted with water to 2.5 wt. % of its original concentration.

Various solutions containing 34 wt. % of ammonium sulfate, 56 wt. % of water, and 10 wt. % of a mixture of AMMONYX® LO, AMMONYX® DO, and glycerin as shown in Table 3 are prepared. Each of these solutions is diluted to 2.5 wt. % of its original concentration for use in the wetting test.

Similar solutions are prepared using propylene glycol instead of glycerin. These solutions generally give Draves wetting results in the 20-50 second range.

TABLE 3

| Draves Wetting Comparison | | | | | | | |
|---|---|---|---|---|---|---|---|
| Component (wt. %) | Control | A | B | C | D | E | F |
| AMMONYX ® LO | 0 | 2.8 | 2.1 | 2.5 | 2.0 | 3.0 | 1.5 |
| AMMONYX ® DO | 0 | 1.2 | 0.9 | 2.5 | 2.0 | 3.0 | 1.5 |
| glycerin | 0 | 6.0 | 5.0 | 5.0 | 6.0 | 4.0 | 5.0 |
| GLUCOPON ® 420-UP | 10 | 0 | 0 | 0 | 0 | 0 | 0 |
| Draves wetting, s | 7.3 | 3.6 | 4.2 | 4.7 | 5.8 | 3.8 | 5.1 |

The results demonstrate excellent wetting properties for the tested and control formulations. However, wetting is as good or better in Formulations A-F with only 3-6 wt. % surfactant in the original mixture versus 10 wt. % APG in the control formulation, a potential cost savings when using the amine oxide blend. Because large amounts of surfactant are used in agricultural applications, small differences in the amount used can translate into a large cost differential.

Stability Testing

To evaluate the ability of amine oxide blends to impart storage stability to ammonium sulfate-based water conditioners, ammonium sulfate is combined at 34 wt. % with water and various combinations of AMMONYX® LO, AMMONYX® DO, and semi-refined glycerin. The mixtures are prepared and held for 14 days at 54° C., 25° C., 4° C., or −15° C. Samples are inspected and rated for stability in comparison with a control sample containing 10 wt. % of AMMONYX® LO. The control sample is stable for 14 days at room temperature, but separation is apparent at the other tested temperatures. Ideally, no separation is observed at any of the temperatures.

As shown in Table 4, the 34 wt. % ammonium sulfate water conditioners containing combinations of AMMONYX® LO, AMMONYX® DO, and semi-refined glycerin are stable at all tested temperatures over a wide range of surfactant combinations and 3 to 6 wt. % amine oxide content. No separation is observed in any sample. In contrast, without the AMMONYX® DO also present (control sample), separation occurs when the samples are either heated or chilled.

Table 5 illustrates that similar excellent results can be achieved when 7 to 7.5 wt. % of propylene glycol is used instead of glycerin. Thus, at least in some aspects, a larger proportion of propylene glycol may be needed to get the same degree of compatibility observed with glycerin.

As shown in Table 6, other $C_2$-$C_4$ glycols (ethylene glycol, diethylene glycol) can be used alone or in combination with propylene glycol or glycerin to give stable ammonium sulfate-based water conditioners. In some samples, the most stressed conditions of −15° C. promoted crystallization in some samples, but the overall results still exceed those seen with the control sample containing only AMMONYX® LO.

Table 7 summarizes the results of testing with other comparative formulations. Each of Comparative Examples 28-36 has 34 wt. % of aqueous ammonium sulfate and AMMONYX® LO as the only amine oxide. Although some samples were better than the control sample, the proportion of glycerin or propylene glycol can be varied without success in making a formulation that is stable at all tested temperatures. It is apparent that a blend of AMMONYX® LO with AMMONYX® DO is desirable for producing stable ammonium sulfate-based water conditioners.

TABLE 4

| Stability Tests: Performance of Amine Oxide Blends with Glycerin | | | | | | | | | | |
|---|---|---|---|---|---|---|---|---|---|---|
| Component (wt. %) | control | 1 | 2 | 3 | 4 | 5 | 6 | 7 | 8 | 9 |
| ammonium sulfate | 34.0 | 34.0 | 34.0 | 34.0 | 34.0 | 34.0 | 34.0 | 34.0 | 34.0 | 34.0 |
| water | 56.0 | 56.0 | 58.0 | 56.0 | 56.0 | 58.0 | 56.0 | 56.0 | 56.0 | 58.0 |
| AMMONYX ® LO | 10.0 | 2.8 | 2.1 | 3.2 | 2.4 | 2.4 | 2.5 | 1.5 | 3.0 | 1.5 |
| AMMONYX ® DO | 0 | 1.2 | 0.9 | 0.8 | 0.6 | 0.6 | 2.5 | 1.5 | 3.0 | 1.5 |
| 54° C. | separates | no separation | | | | | | | | |
| 25° C. | no separation | no separation | | | | | | | | |
| 4° C. | separates | no separation | | | | | | | | |
| −15° C. | separates | no separation | | | | | | | | |

TABLE 5

| Stability Tests: Performance of Amine Oxide Blends with Propylene Glycol | | | | | | | | | | |
|---|---|---|---|---|---|---|---|---|---|---|
| Component (wt. %) | control | 10 | 11 | 12 | 13 | 14 | 15 | 16 | 17 | 18 |
| ammonium sulfate | 34.0 | 34.0 | 34.0 | 34.0 | 34.0 | 34.0 | 34.0 | 34.0 | 34.0 | 34.0 |
| water | 56.0 | 51.0 | 51.5 | 51.5 | 52.0 | 51.0 | 51.5 | 51.0 | 52.0 | 52.0 |
| AMMONYX ® LO | 10.0 | 5.25 | 5.25 | 4.9 | 4.9 | 5.25 | 5.25 | 4.9 | 4.9 | 4.9 |
| AMMONYX ® DO | 0 | 2.25 | 2.25 | 2.1 | 2.1 | 2.25 | 2.25 | 2.1 | 2.1 | 2.1 |
| propylene glycol | 0 | 7.5 | 7.0 | 7.5 | 7.0 | 7.5 | 7.0 | 8.0 | 7.0 | 7.0 |
| 54° C. | separates | no separation | | | | | | | | |
| 25° C. | no separation | no separation | | | | | | | | |
| 4° C. | separates | no separation | | | | | | | | |
| −15° C. | separates | no separation | | | | | | | | |

TABLE 6

| Stability Tests: Performance of Amine Oxide Blends with Glycols or Glycol Combinations | | | | | | | | | | |
|---|---|---|---|---|---|---|---|---|---|---|
| Component (wt. %) | control | 19 | 20 | 21 | 22 | 23 | 24 | 25 | 26 | 27 |
| ammonium sulfate | 34.0 | 34.0 | 34.0 | 34.0 | 34.0 | 34.0 | 34.0 | 34.0 | 34.0 | 34.0 |
| water | 56.0 | 51.0 | 51.0 | 51.0 | 51.0 | 51.0 | 51.0 | 51.0 | 51.0 | 51.0 |
| AMMONYX ® LO | 10.0 | 5.25 | 5.25 | 5.25 | 5.25 | 5.25 | 5.25 | 5.25 | 5.25 | 5.25 |
| AMMONYX ® DO | 0 | 2.25 | 2.25 | 2.25 | 2.25 | 2.25 | 2.25 | 2.25 | 2.25 | 2.25 |
| glycerin | 0 | 7.5 | 0 | 0 | 3.75 | 0 | 0 | 1.88 | 0 | 0 |
| ethylene glycol | 0 | 0 | 7.5 | 0 | 0 | 3.75 | 0 | 0 | 1.88 | 0 |
| diethylene glycol | 0 | 0 | 0 | 7.5 | 0 | 0 | 3.75 | 0 | 0 | 1.88 |
| propylene glycol | 0 | 0 | 0 | 0 | 3.75 | 3.75 | 3.75 | 5.63 | 5.63 | 5.63 |
| 54° C. | separates | no separation | | | | | | | | |
| 25° C. | no separation | no separation | | | | | | | | |
| 4° C. | separates | no separation | | | | | | | | |
| −15° C. | separates | separates | separates | separates after thaw | no separation | no separation | no separation | no separation | crystals | crystals |

TABLE 7

| Stability Tests: Performance of AMMONYX ® LO with Glycol Combinations (Comparative Examples) | | | | | | | | | | |
|---|---|---|---|---|---|---|---|---|---|---|
| component (wt. %) | control | C28 | C29 | C30 | C31 | C32 | C33 | C34 | C35 | C36 |
| ammonium sulfate | 34.0 | 34.0 | 34.0 | 34.0 | 34.0 | 34.0 | 34.0 | 34.0 | 34.0 | 34.0 |
| water | 56.0 | 58.5 | 58.5 | 53.5 | 58.5 | 58.5 | 53.5 | 52.5 | 52.0 | 51.5 |
| AMMONYX ® LO | 10.0 | 6.75 | 6.0 | 7.5 | 6.75 | 6.0 | 7.5 | 7.5 | 7.5 | 7.5 |
| glycerin | 0 | 0.75 | 1.5 | 5.0 | 0 | 0 | 0 | 0 | 0 | 0 |
| propylene glycol | 0 | 0 | 0 | 0 | 0.75 | 1.5 | 5.0 | 6.0 | 6.5 | 7.0 |
| 54° C. | separates | equal | equal | worse | equal | equal | no separation | worse | worse | worse |
| 25° C. | no separation | no separation | no separation | no separation | no separation | no separation | no separation | no separation | no separation | no separation |
| 4° C. | separates | sl. better | better | equal | sl. better | better | better | worse | worse | worse |
| −15° C. | separates | equal | equal | equal | sl. better | better | better | worse | worse | worse |

No separation is the best result.

When compared with a control sample that separates (i.e., at 54° C., 4° C., and −15° C.), results are rated as equal, slightly better, better, or worse unless no separation is observed.

The preceding examples are meant only as illustrations; the following claims define the scope of the invention.

We claim:

1. A water conditioner composition useful for agricultural formulations, comprising:
(a) 30 to 50 wt. % of ammonium sulfate;
(b) 2 to 10 wt. % of a fatty amine oxide blend, the fatty amine oxide blend comprising:
(b1) a $C_{12}$-$C_{14}$ fatty amine oxide, wherein the $C_{12}$-$C_{14}$ fatty amine oxide comprises N,N-dimethyl-N-dodecylamine-N-oxide; and
(b2) a $C_8$-$C_{10}$ fatty amine oxide, wherein the $C_8$-$C_{10}$ fatty amine oxide comprises N,N-dimethyl-N-decylamine-N-oxide; and
(c) water; and
(d) 2 to 8 wt. % of an antifreeze agent, wherein the antifreeze agent comprises glycerin, a $C_2$-$C_6$ glycol, or a combination thereof;
wherein weight % amounts are based on an amount of water conditioner composition.

2. The water conditioner composition of claim 1 wherein a weight ratio of (b1) to (b2) is within a range of 10:1 to 1:10.

3. The water conditioner composition of claim 2 wherein the weight ratio of (b1) to (b2) is within the range of 4:1 to 1:1.

4. The water conditioner composition of claim 1 comprising 30 to 40 wt. % of ammonium sulfate.

5. The water conditioner composition of claim 1 comprising 3 to 8 wt. % of the fatty amine oxide blend.

6. The water conditioner composition of claim 1 wherein the antifreeze agent is selected from a group consisting of glycerin, ethylene glycol, propylene glycol, diethylene glycol, dipropylene glycol, hexylene glycol, and mixtures thereof.

7. The water conditioner composition of claim 1 comprising 25 to 68 wt. % of water.

8. The water conditioner composition of claim 1 further comprising a secondary surfactant selected from a group consisting of nonionic surfactants, anionic surfactants, cationic surfactants, amphoteric surfactants, and zwitterionic surfactants.

9. An agricultural formulation comprising:
(a) a weak acid-based herbicide; and
(b) the water conditioner composition of claim 1.

10. The agricultural formulation of claim 9 wherein the weak acid-based herbicide is selected from a group consisting of glyphosates, glufosinates, phenoxycarboxylic acids, halobenzoic acids, pyrimidine carboxylic acids, pyrimidine carboxamides, pyridine carboxylic acids, pyridine carboxamides, sulfonylureas, and combinations thereof.

* * * * *